Jan. 1, 1963 A. H. YOUMANS 3,071,687
GEOPHYSICAL PROSPECTING METHODS AND APPARATUS
Filed April 10, 1959 2 Sheets-Sheet 1
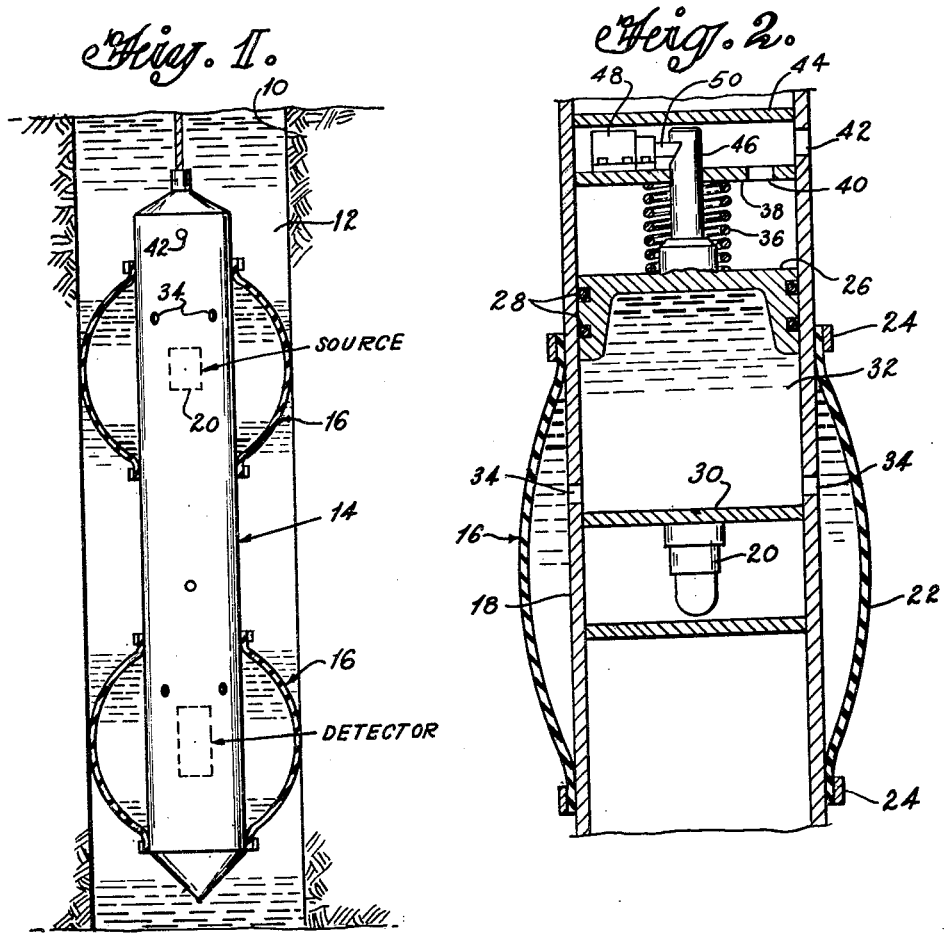
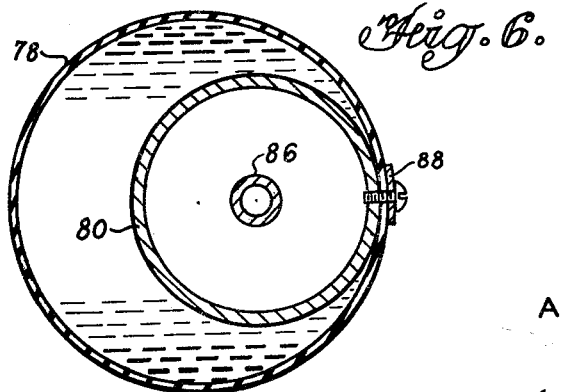
INVENTOR
ARTHUR H. YOUMANS
BY Robert K. Schumacher
ATTORNEY

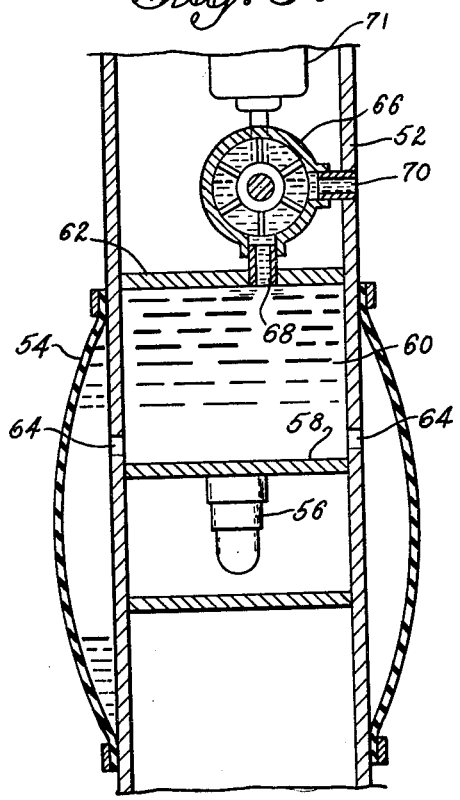
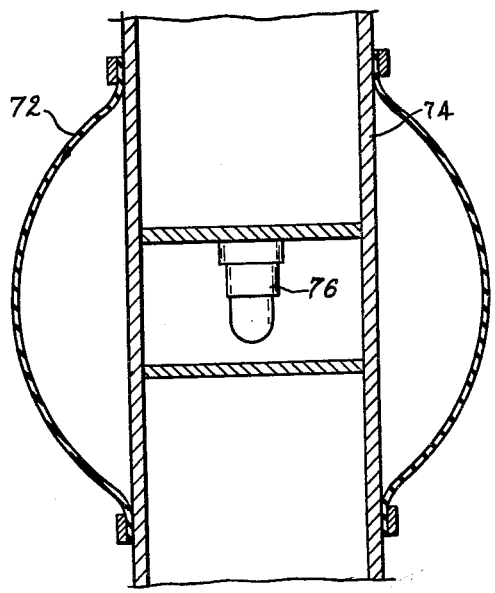
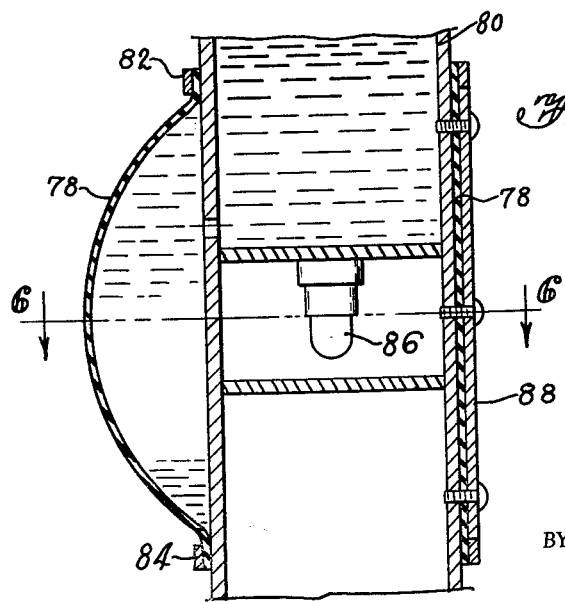

United States Patent Office 3,071,687
Patented Jan. 1, 1963

3,071,687
GEOPHYSICAL PROSPECTING METHODS
AND APPARATUS
Arthur H. Youmans, Tulsa, Okla., assignor to Well Surveys, Incorporated, a corporation of Delaware
Filed Apr. 10, 1959, Ser. No. 805,527
8 Claims. (Cl. 250—83.3)

This invention relates to the art of geophysical prospecting for valuable mineral deposits. More particularly, the invention is concerned with prospecting for oil by means and methods commonly known as radioactivity well logging, and, especially, for that form of radioactivity well logging known as activation logging.

Activation well logging involves the detection and logging of radiations arising as a result of the production of radioactive isotopes of various elements making up the subsurface strata. These isotopes may be produced in the course of producing other types of logs, for example, the well-known neutron-neutron log or the neutron-gamma ray log. In both of these conventional logs, a source of high speed neutrons and a detector of radiations are moved simultaneously through the well bore, in the course of which, the subsurface strata are irradiated and bombarded with the neutrons, and, depending upon the nature of the detector which is employed, either slow neutrons are detected to produce a neutron-neutron log, or gamma radiations are detected to produce the neutron-gamma ray log. The radiations that are thus detected arise instantaneously and are dissipated immediately. However, the total energy of the neutron source does not result in the production of only slow neutrons and gamma radiations; rather, as indicated above, isotopes of many elements are formed which are radioactive and begin to decay immediately upon formation, some of them dying out almost instantaneously and others having longer half lives. Activation logging involves the detection of such decay radiations and the making of a log therefrom which is indicative of desired information pertaining to the strata.

It is known that in the production of activation logs, as generally described above, background radiations arise because of the fact that certain well fluids also are activated during the course of the neutron bombardment and, just as the formation itself emanates radioactive decay energy, so does the well bore fluid. These radiations are detected along with those arising in the formation surrounding the well bore, thereby leading to an inaccurate logging of formation characteristics. Moreover, the problem is further aggravated by a varying response from the well bore fluid due to the fact that variations in bore hole diameter constantly present a changing thickness of well bore fluids.

Inasmuch as activation logs are a highly desirable source of information concerning the characteristics of the rock, it is of considerable interest that inaccuracies which are introduced into them as a result of activation of the well bore fluids should be reduced as fully as possible.

Bearing in mind that the radiations which arise in the well bore fluids do so concurrently with radiations from the formation itself and that these radiations may be of substantially the same magnitude as those emanating from the formation, one is impressed at once with the difficulty of the problem of avoiding these inaccuracies and is led to conclude that there may be no solution to the problem. However, according to this invention, undesirable effects resulting from such well bore fluid decay radiation are reduced sufficiently that they no longer constitute a serious interference with well logging operations.

Accordingly, it may be stated that an object of this invention is to bring about the substantial elimination of undesirable radiation effects arising as a result of the creation of radioactive isotopes in well bore fluid which isotopes are unstable and therefore undergo radioactive decay.

The invention contemplates various embodiments and aspects thereof; however, before proceeding to describe it in relation to specifically detailed embodiments, it is desired to present a more general statement concerning the means and methods by which the invention accomplishes the desired result.

Instruments of the type employed in radioactivity well logging and which are lowered into the well for use according to any standard procedure take the form of a circular, generally cylindrical, elongated body. The diameter of such instruments is not critical and depends upon the particular design adopted for use. Thus, such instruments occupy more or less of the horizontal cross section of the bore hole depending on the diameter of the instrument. In no case does the instrument occupy the entire cross section of the bore hole and, accordingly, there is at all times in a vertical bore hole a volume surrounding the instrument which, disregarding slight variation in bore hole diameter, may be described as generally annular. This volume, insofar as the present invention is concerned, is filled with well bore fluids which create the problems described herein. Accordingly, the well bore instrument in traversing the strata must also traverse the full volume of well bore fluid.

It will be recalled that the extent of isotope production in any material is proportional to the intensity of the exciting flux which is directed upon it and also depends upon the time of exposure thereto. Thus, a particular fluid or a particular formation material becomes radioactive, i.e., the decay radiations thereof become more intense, as the time during which it is subjected to exciting conditions is longer, assuming, of course, a substantially constant source of radiations and assuming that the irradiation time is not long compared to the half life of the induced radioactivity. The difficulties arising from the induced activity of the well fluids are, of course, proportional to the intensity of the radiations from the fluids. It might appear that by increasing the speed of the well logging instrument in its movement through the well bore and the well fluids, the effect of the fluid would be minimized. However, this is not so, as those skilled in the art are fully aware, since a logging speed must be chosen which results in optimum determination of strata activation, and any increase in speed beyond this value adversely affects the desired characteristics of the log. Consequently, in the absence of knowledge of this invention, one concludes that the problem cannot be solved by considerations involving the time of radiation factor. According to this invention, instead of moving the instrument faster in the well bore, the well bore fluids themselves are caused to more rapidly pass the well bore instrument as it moves through the well and thereby, as will appear, the described difficulties are overcome. This is accomplished in a manner now in general to be described.

According to this invention, well logging instruments which are lowered into the well bore are provided with means effecting an increase in the horizontal cross sectional area of the well bore instrument at critical points along its length, whereby as the well bore instrument is raised or lowered in the well, well bore fluids which it must displace are caused to flow by said critical points of the instrument at an increased rate and at a greater radial distance from the neutron source. The results are that, although the same volume of well bore fluid passes by the logging instrument as would be the case without the enlarged portion, the fluid does so in such a manner that the time during which a given volume is exposed to activating radiations is reduced; furthermore, the intensity of the radiation experienced by each unit volume of the fluid is diminished. The radiation exposure time is of course, in inverse proportion to the fluid velocity and the radiation intensity is inversely proportional to the square of the distance to the source.

As indicated above, the horizontal cross sectional area occupied by the well bore instrument is increased at critical points. Plural points are indicated inasmuch as this is the form contemplated as the preferred embodiment of the invention. However, satisfactory improvements may be realized by altering the velocity of the well bore fluid at one point. Since it is desired to reduce the time during which the fluids are exposed to radiations, the point of cross sectional increase which must first be considered is the point at which the intensity of radiation from the instrument itself is the greatest. This, of course, is directly opposite the source of activating radiations in the well bore instrument itself, namely, the neutron source. According to this invention, it is found that if the diameter of the well bore instrument is increased at this point to about the diameter of the well bore itself, well bore fluids which pass this point, and which later arrive at a point in the area of the detecting instrument, will introduce decay radiations into the detector to a much less extent than will the same volume of fluid where no increase in its speed has been effected. Now, still further according to the invention, it is found that if the same volume of well bore fluid is caused to pass by a point opposite the detecting instrument at an increased speed, but in the meantime having undergone a slowing in its velocity between the point of passing the radiation source and the point of detection, substantially double the reduction in radiation arising in the decaying well bore fluids is accomplished. In general, it is found that the greater the time of reduced velocity between the source and the detector, the lesser is the radiation flux to be observed by the detecting instrument as the fluid passes through the area of detection. This, upon reflection, will be appreciated to result from the fact that this period of time permits the well bore fluid to dissipate some of its short lived radioactivity before reaching the area of detection. If the well bore instrument is of the same diameter along its entire length no such reduction in the intensity of measured radiations arising in the well bore fluids is accomplished.

From the foregoing, it should be understood that reduction in radiation effects at the detector from well fluid decay are produced by enlarging only the general area of the instrument around the detector. Thus, in suitable instances, one may enlarge only this area or, alternatively, the neutron source area as desired. However, it is preferable according to the invention to enlarge both, leaving an unenlarged area therebetween.

It is believed that the underlying principles of the invention will be understood from the preceding paragraphs and now it is desired to present a discussion of the invention in greater detail and with reference to drawings which are appended hereto.

Within the spirit of the invention, various embodiments of means suitable for effecting the described fluid velocity increase may be provided; however, generally such means may be described as radially extending enlargements of the instrument housing, which enlargements encircle and are attached to the housing. Such enlargements may be rigid or flexible, and they may fill the entire horizontal area of the bore hole or not, depending upon the nature of the well undergoing study. The invention contemplates also that such enlarged portions of the instruments may be expandable and contractable. In such cases, the enlarged portion occupies substantially the entire cross sectional area of the bore hole at all times regardless of variations in the diameter of the well bore, the enlarged portion being adapted to expand as the bore hole diameter increases and to contract, or to deflate, as bore hole diameter narrows. By this arrangement, a substantially constant flow of fluid past the source and detector is maintained, thereby avoiding the difficulties which would otherwise be introduced by changing thickness of the well bore fluids.

More simple construction within the invention is afforded by the provision of a rigid non-expandable enlarged portion of invariable horizontal cross-section; however, this form of the invention is not considered to be as effective as the foregoing expansible type.

Similarly, the means for increasing fluid velocity may take the form of a porous but generally solid sponge, for example, a rubber sponge. In this form of the invention, the sponge is so formed as to substantially occupy the cross-section of the bore hole and since it is filled with bore hole fluid at all times when not under compression, and tends to retain such fluid, the desired effect is accomplished. This form of the invention is especially suitable for cased wells where substantially no change in bore hole diameter is encountered.

The general nature of well logging equipment and the details of various methods of well logging are now so widely known that it is not considered necessary for an adequate understanding of the present invention to set forth a full description either of such equipment or the methods. Accordingly, for purposes of simplicity and brevity herein, the drawings have been restricted to the precise subject matter under consideration and the description thereof extends, for the most part, only to the details and the functioning of the new apparatus. However, for purposes of describing and claiming the invention herein, reference is made to United States Patent Number 2,303,688, issued to Robert Earl Fearon on December 1, 1942, and to application Serial Number 579,829 of Thomas P. Hubbard, Jr. and Arthur H. Youmans, filed April 23, 1956, the disclosures of which patent and application are made a part hereof. Reference is now made to the drawings.

FIG. 1 of the drawings is a pictorial illustration of a well bore instrument positioned within a well bore in the presence of well bore fluids, revealing the general location and relationship of the enlarged portions herein described to the instrument itself and to the walls of the well bore;

FIG. 2 of the drawings is a vertical sectional view through a portion of a well logging instrument housing showing the detail of the present invention as applied to the area of the instrument housing adjacent the radiation source;

FIG. 3 of the drawings is a further embodiment of the invention, the illustration also being a vertical sectional view through the well logging instrument housing in the area adjacent the radiation source;

FIG. 4 of the drawings is a still further modification of the invention illustrating the same as applied to the well logging instrument in the area of the radiation source; and FIG. 5 is a vertical sectional view of another form of the invention illustrating a sheath which effects decentralizing of the instrument in the borehole.

FIG. 6 is a horizontal sectional view of the form of the invention of FIG. 5, the section being taken at a point on the instrument corresponding to the line 6—6 of FIG. 5.

Both FIGURES 2 and 3 of the drawings reveal the expansible and contractable type of apparatus encircling the housing whereas FIG. 4 illustrates the rigid or invariable type. It will be understood that the construction shown with relation to the radiation source is applicable in an identical fashion to the area of the well logging instrument wherein the radiation detector is contained. Thus, in describing the invention, reference will be made only to the area of the well logging instrument wherein the neutron source is located, it being understood that the identical structure may be duplicated in the same instrument at the area of location of the radiations detector if desired and that, further, if desired, the described invention may be applied only to the region of the neutron source or only to the radiations detector or bath.

Referring to FIG. 1 of the drawings, numeral 10 denotes a well bore containing well fluid, for example, a drilling mud, denoted by numeral 12. Numeral 14 refers generally to a well logging instrument positioned within the well bore, and numeral 16 denotes the points at which the enlarged portions of the instrument housing approach the walls of the well bore. It will be understood that the well logging instrument illustrated in FIG. 1 is suspended in the well bore and in use is moved upwardly and downwardly therein by means of a cable extending from above ground and that the logging operations carried out are entirely in a conventional manner and with conventional equipment. If necessary for an understanding of well logging methods and equipment particularly with respect to activation logging, reference may be made to the above-mentioned United States Patent Number 2,303,688, issued on December 1, 1942, to Robert Earl Fearon and to the said application Serial Number 579,829 of Hubbard and Youmans.

Referring now to FIG. 2 of the drawings, numeral 18 denotes a housing of a well logging instrument. Numeral 20 denotes a neutron source of any conventional type located within housing 18. Numeral 22 denotes an expandable bag or sheath which entirely encircles housing 18. Sheath 22 may be of any suitable material which expands under pressure and which has the necessary properties of ruggedness for well bore operations. Certain rubbers are suitable. Sheath 22 is affixed to housing 18 in a fluid-tight manner by ring clamps as indicated at numeral 24.

Numeral 26 refers to a piston located within housing 18, mounted in slidable relationship thereto upon circular ring seals denoted by numeral 28. Numeral 30 denotes a circular plate which, together with piston 26 forms a fluid storage chamber denoted by numeral 32 within the housing of the well logging instrument. Storage chamber 32 is provided with ports 34 which provide communication with the interior of sheath 22.

Numeral 36 denotes a spring which seats upon a further plate denoted by numeral 38 rigidly affixed within the housing of the instrument, the energy of which spring is brought to bear upon piston 26 whereby to effect compression of fluids contained within the chamber 32 so as to expand the outer sheath.

As can be seen in the drawings, plate 38 is provided with a port denoted by numeral 40 which port communicates with a further port 42 which penetrates the housing of the well logging instrument. Numeral 44 denotes a sealing plate located just above port 42 which plate serves to seal the remainder of the well logging instrument so as to confine bore hole fluids which enter through port 42 within the desired volume of the instrument. Of course, it will be understood that the purpose of providing ports 42 and 44 is to permit the well bore fluid to flow into the interior of the housing so as to apply the same head pressure on piston 26 that exists on the exterior of the casing, thereby effecting a pressure equalization between the exterior of the housing and the interior of the sheath itself; otherwise, the spring 36 would have to work against the head pressure of the well bore fluid in effecting expansion of the sheath.

Referring still further to FIG. 2 of the drawings, numeral 46 denotes a latch bar which, as can be seen, is attached to the upper surface of piston 26 and extends upwardly through plate 38. Numeral 48 denotes a solenoid, the armature 50 which extends outwardly to underlie the latch portion of the latch bar, thereby, when de-energized, serving to hold piston 26 in retracted position. It will be understood, of course, that the purpose of this solenoid latch arrangement is to prevent the piston 26, under the influence of the spring, from fully expanding the sheath prior to the time that the instrument is inserted into the well bore; were the piston not so restrained, at the time of being lowered downwardly into the well, sheath 22 would be so expanded that it could not be lowered into the well but, rather, would act as a piston in the well against the well bore fluids and could not be lowered except with great difficulty. By retracting the spring and the piston during the time that the instrument is being lowered into the well the sheath is substantially fully deflated, thereby offering little resistance to the movement of the instrument into the well. As will be understood, when the instrument has reached the desired depth, the solenoid may be actuated in a conventional manner by an electrical control signal initiated from the surface of the earth, whereby to withdraw the armature from latching position and allow the piston to expand the sheath against the wall of the well bore.

Prior to inserting an instrument equipped as illustrated in FIG. 2 into the well bore, sheath 22 and storage chamber 32 are filled substantially fully with a suitable fluid so as to take as full advantage as possible of the potential expansion of the sheath. The instrument is then introduced into the well bore to the desired depth and the solenoid is actuated to release the piston, thereby expanding the sheath as fully as possible at the particular point. The instrument then is raised toward the surface in a conventional fashion. As wider sections in the bore hole are traversed, sheath 22 is thereby permitted greater expansion and does so under the force of the piston until it is again restrained by the walls of the well bore. After proceeding upwardly in the well to a more narrow point, the walls of the well bore then compress the sheath thus forcing the fluid therein back into the storage chamber against the pressure of the spring. This alternate expansion and compression continues as the instrument proceeds upwardly in the well bore and in so doing maintains the highest possible fluid velocity of the well bore fluid as it passes the areas of neutron radiation and detection, thus effecting the desired result heretofore described.

The embodiment of the invention described in FIG. 3 operates somewhat differently from that described in FIG. 2 and, as may be seen from the drawings, is constructed in a different fashion; however, the results achieved by the two devices are substantially similar.

Referring to FIG. 3 of the drawings, numeral 52 denotes the outer housing of the well logging instrument provided with a sheath 54 which is entirely similar in all respects to that of FIG. 2. As can be seen in the drawings, a neutron source denoted by numeral 56 is located within the inner housing volume enveloped by the sheath and is separated from the portion of the instrument thereabove by a plate 58 which forms a fluid tight seal with the housing. Numeral 60 denotes a chamber formed by plate 58 and plate 62, together with the walls of the housing 52. Numeral 64 denotes ports in the wall of the said chamber which provides communication between the chamber and the interior of the sheath 54.

Mounted above plate 62 is a motor driven pump designated by numeral 66. Pump 66 may be of any suitable type; however, as may be seen in the drawings the type illustrated is a centrifugal pump, the discharge of which is connected through passageway 68 to chamber 60. The inlet port of pump 66 is connected by passageway 70 to the exterior of the housing and, therefore, when in operation, well bore fluids are drawn inwardly by the pump and discharged into the chamber and thereafter through ports 64 into the sheath itself. Since the interior and exterior of the device are communicating, it will be understood that the head pressure within the well is equalized between the two points. Pump 66 is driven by any suitable electric motor, which motor in the drawings is denoted by numeral 71.

In operation the instrument equipped as illustrated in FIG. 3 is lowered into the well bore to a point in which it is desired to begin logging operations. During the time of lowering, the motor driven pump has been de-energized so that there is no expansion of the sheath and therefore no piston effect of the sheath with the well bore walls. When it is desired to start logging operations, the pump is started in motion, thereby delivering well bore fluid into the interior of the sheath and effecting expansion thereof to a point where the sheath is against the well bore walls. As in the case of the device of FIG. 2, as the instrument is raised in the well bore and encounters levels having a wider cross section, the pump being in continuous operation, additional fluid is discharged into sheath 54 thereby effecting expansion to a point where the sheath occupies the full cross section of the well bore.

As the sheath may approach more narrow sections, it is compressed between the well bore walls, fluid being forced backwardly into the chamber 60 and through the pump to the exterior of the housing by way of passageway 70. Thus, at all times the well bore fluid through which the instrument is moving is compelled to pass the areas of neutron radiation and/or the areas of neutron detection of the well logging instrument at the greatest possible velocity, thereby accomplishing the aims set forth hereinabove.

It might appear that discharging the well bore fluids after having been confined and subjected to the neutron flux would result in substantial increase in radiations in the region of the detector; however, this does not occur for the reason that the fluids are discharged above the sheath surrounding the source which effects a delay in reaching the detector sufficiently to allow dissipation of disturbing activities to a large degree. Greater time for such dissipation may be provided by locating the point of intake and discharge at a higher point on the instrument, for example, in the region of the point of cable attachment, or such fluids may be moved very rapidly to a point below the detector and there discharged. Moreover, the form of the invention shown in FIG. 3 may be employed in cased wells without encountering the necessity for discharging fluids to any substantial extent.

FIG. 4 of the drawings illustrates a further embodiment of the invention. In this form of the invention, a sheath 72 is shown in position about a section of a well logging instrument denoted by numeral 74. As may be seen from the drawings, sheath 72 surrounds or envelopes a portion of the instrument in which the neutron source is contained, which source is designated numeral 76. As has been indicated hereinbefore, this form of the invention has a prefixed diameter and, therefore, does not accommodate itself to changing diameters of the well bore as do the other forms of the invention.

Referring to FIGURES 5 and 6, numeral 78 denotes a modified form of sheath, numeral 80 denotes the housing of the instrument, and numerals 82 and 84 denote ring clamps fixing the sheath to the housing. Numeral 86 denotes schematically a neutron source. As will be observed, the sheath in this form of the invention is not symmetrically located with respect to the instrument and is closely adjacent the housing along the length thereof and for a small portion of its circumference. Whether the sheath itself is shaped to an unsymmetrical form or whether a generally annular sheath is held against the housing along a line substantially parallel to the long axis, as by a longitudinally extending strip denoted in the drawings by numeral 88, is not especially critical. The objects and advantages of this construction will now be discussed. It will be understood that the sheaths herein described and illustrated as annular need not be symmetrical in cross section but may be of such design as to force the instrument to occupy a position in the borehole generally at or near one wall. This may be accomplished as in FIGS. 5 and 6. The sheath 78, about instrument 80, may in this embodiment also be either of relatively rigid construction or it may be variable in cross-sectional area, as by inflation. The nature and manner of operation of this form of the invention may be the same as indicated above as regards the other forms.

The advantage of asymmetrical construction will be seen to be that it may be used to orient the instrument so that it has always the same side nearest to the rock surface, permitting the source and detector to be, respectively, asymmetric in their construction when such is desirable. In any case this embodiment permits the instrument to be nearer the rock, especially in large diameter boreholes, than is possible when a centralizing device is employed. Now, although the purpose of the invention has been described to be the provision of means and methods for reducing the effect of borehole fluid, it is of course, desirable that the apparatus should be constructed so as to produce an enhancement of the quality or intensity of the formation response. In general, and practice, therefore, the apparatus will be constructed so as to selectively transmit radiations which it is desirable to transmit and selectively absorb undesirable radiations when possible. Thus, in the case where a symmetrical sheath surrounds the source, it is desired to transmit neutrons outwardly in all directions. When such a sheath surrounds the detector it is desired to transmit only those radiations which the detector is intended to detect, and to absorb other radiations. When an asymmetrical sheath is employed, it may be particularly desirable that both at the source and at the detector as little radiation as possible be transmitted by the side of the sheath away from the rock face. Thus, it will be understood that when this form of sheath is employed the desired log response may be improved without detracting appreciably from the desired objective of reducing the fluid effect.

Within the invention, activation logging is carried out in any suitable equipment, such as that described in the aforementioned patent, such equipment being modified as taught herein. The well logging equipment first is lowered into the well bore to the desired depth and the sheaths thereon are expanded. The equipment then is drawn upwardly in the well bore in an entirely conventional fashion under accelerated fluid flow conditions and logs are made based upon the modified radiations to obtain an activation well log of the improved accuracy made possible by this invention.

As regards the fluid which may be employed to expand the sheaths, the principal objects of the invention are unrelated to the nature of the liquid and it may, therefore, be well bore fluid as indicated in the operation of the embodiment illustrated by FIGURE 3. However, suitable fluids are, for example, carbon tetrachloride or oil.

The asymmetrical structure illustrated in FIGS. 5 and 6 may advantageously be filled with mercury or gallium in the case of the detector, to shield against gamma rays coming from the well fluid, and in the case of the source, with hydrogenous or other moderating or absorbing material to reduce neutron irradiation of the well fluid. The principal objects of the invention are attained if water, oil or the like is employed in both cases. Alternatively if a relatively rigid structure of this general configuration is employed, lead, iron or the like may be employed to advantage when it is specifically desired to reduce the amount of observed radiation arising in the direction of the borehole relative to that from the adjacent rock.

The relatively rigid structure illustrated by FIGURE 4 may be formed of such low-density materials as aluminum and magnesium. Alternatively they may be formed of a somewhat flexible material such as neoprene sponge rubber or a suitable plastic.

While the invention has been described in relation to specific embodiments, it will be understood that it is not to be thus limited, and that, within the spirit of the invention, many modifications may be made which are not herein disclosed but are intended to be within the invention herein described and claimed.

I claim:
1. In a method of geophysical prospecting within a well bore wherein radiations from the decay of artificially produced isotopes in the formation around said well bore are detected and measured to provide a sensible indication of intelligence which is informative of characteristics of the said formation, and wherein said well bore contains fluids which must be traversed by the prospecting equipment in the described operations, the improvement which comprises effecting with a flux of radiations the production of said isotopes, at a time thereafter detecting at least part of the flux of decay radiations from said isotopes produced in said formations, and locally effecting an increase in the velocity of well fluid flow as said fluid intercepts at least one of said fluxes whereby the effect of activation of the well fluid is small relative to the effect of activation of the formation.

2. A well tool for activation well logging within a well bore comprising an outer housing and, contained therein, a source of neutrons in a first region of said tool and a radiation detector in a second region of said tool longitudinally spaced from said first region, said detector being preferentially sensitive to delayed radiations occasioned by neutrons from said source relative to its sensitivity to radiation produced simultaneously with neutrons from said source, and means associated with said housing effecting substantial local enlargement thereof in both of said regions and providing between said regions a housing cross-section less in area than in said regions whereby as fluid flows by said tool it experiences in order an increase in velocity as it passes said first region, a decrease in velocity as it passes between said regions, and an increase in velocity as it passes said second region.

3. In an apparatus for radioactivity well surveying within a well bore, said apparatus including an outer housing and, contained therein, a source of neutrons in a first region of said apparatus and a radiation detector in a second region of said apparatus longitudinally spaced from said first region and responsive to radiations occasioned by said neutron source, the improvement which comprises means associated with said housing effecting a substantial local enlargement thereof in one of said regions, said enlargement being asymmetrical, being relatively negligible along a line parallel to the long axis of said housing for a portion of its circumference and relatively large diametrically opposite said portion but smaller diametrically than said borehole.

4. In an apparatus for radioactivity well surveying within a well bore, said apparatus including an outer housing and, contained therein, a source of neutrons in a first region of said apparatus and a radiation detector in a second region of said apparatus longitudinally spaced from said first region and responsive to radiations occasioned by said neutron source, the improvement which comprises means associated with said housing effecting a substantial local enlargement thereof in one of said regions, said enlargement being asymmetrical, being relatively negligible along a line parallel to the long axis of said housing for a portion of its circumference and relatively large diametrically opposite said portion but smaller diametrically than said borehole, said portion being urged generally against the well of the well.

5. In an apparatus for radioactivity well surveying within a well bore, said apparatus including an outer housing and, contained therein, a source of neutrons in a first region of said apparatus and a radiation detector in a second region of said apparatus longitudinally spaced from said first region and responsive to radiations occasioned by said neutron source, the improvement which comprises an expandable and contractable sheath associated with said housing effecting a substantial local enlargement thereof in one of said regions, and associated means contained in said housing effecting expansion of said sheath, said associated means including a pump, a motor for driving said pump and ducting connecting said pump at its intake side to said well bore fluid and at its discharge side to the interior of said sheath.

6. In an apparatus for radioactivity well surveying within a well bore, said apparatus including an outer housing and, contained therein, a source of neutrons in a first region of said apparatus and a radiation detector in a second region of said apparatus longitudinally spaced from said first region and responsive to radiations occasioned by said neutron source, the improvement which comprises an expandable and contractable sheath associated with said housing effecting a substantial local enlargement thereof in one of said regions, and associated means contained in said housing effecting expansion of said sheath, said associated means including a cylinder, a passageway connecting said cylinder with said sheath, a piston in said cylinder, means effective on said piston for advancing it into said cylinder and for permitting its withdrawal, and releasable locking means between said piston and said casing for holding said piston in withdrawn position; said housing having a port opening to said well bore above said piston thereby bringing well head pressure to bear upon said piston and effecting equilibrium pressure conditions between the interior of said sheath and said well bore.

7. In a method of geophysical prospecting within a well bore wherein radiations from the decay of artificially produced isotopes in the formation around said well bore are detected and measured to provide a sensible indication of intelligence which is informative of characteristics of the said formation, and wherein said well bore contains fluids which must be traversed by the prospecting equipment in the described operations, the improvement which comprises effecting with a flux of radiations the production of said isotopes, at a time thereafter detecting at least part of the flux of decay radiations from said isotopes produced in said formations, and substantially dissipating the activation of the well fluid at the point of detection prior to said detecting, whereby the effect of activation of the well fluid is small relative to the activation of the formation.

8. In an apparatus for radioactivity well surveying within a well bore, said apparatus including an outer housing and, contained therein, a source of neutrons in a first region of said apparatus and a radiation detector in a second region of said apparatus longitudinally spaced from said first region and responsive to radiations occasioned by said neutron source, the improvement which comprises an expandable and contractable container means associated with said housing effecting a substantial enlargement thereof, the interior of said container means communicating with fluid from the well bore.

References Cited in the file of this patent

UNITED STATES PATENTS

| | | |
|---|---|---|
| 2,564,198 | Elkins | Aug. 14, 1951 |
| 2,652,496 | Herzog | Sept. 15, 1953 |
| 2,747,100 | Wyllie | May 22, 1956 |
| 2,926,259 | Dewan | Feb. 23, 1960 |
| 2,935,615 | True | May 3, 1960 |
| 2,963,587 | Rickard | Dec. 6, 1960 |

UNITED STATES PATENT OFFICE

CERTIFICATE OF CORRECTION

Patent No. 3,071,687

January 1, 1963

Arthur H. Youmans

It is hereby certified that error appears in the above numbered patent requiring correction and that the said Letters Patent should read as corrected below.

Column 5, line 3, for "bath" read -- both --; column 9, line 64, for "well", first occurrence, read -- wall --.

Signed and sealed this 23rd day of July 1963.

(SEAL)
Attest:

ERNEST W. SWIDER
Attesting Officer

DAVID L. LADD
Commissioner of Patents